H. C. BROWN.
CORN HEADER.
APPLICATION FILED DEC. 7, 1911.
1,054,502.
Patented Feb. 25, 1913.
4 SHEETS—SHEET 3.
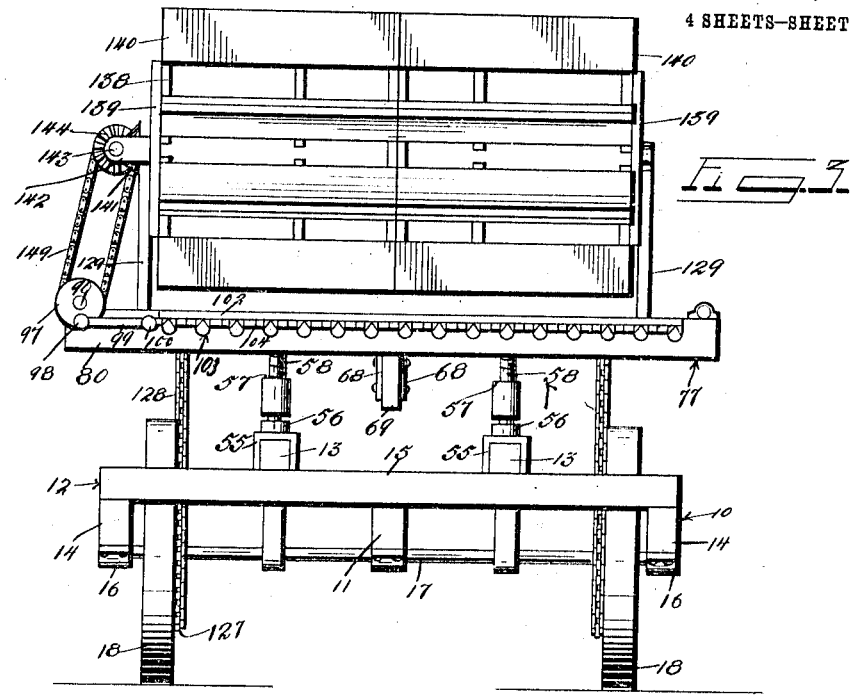
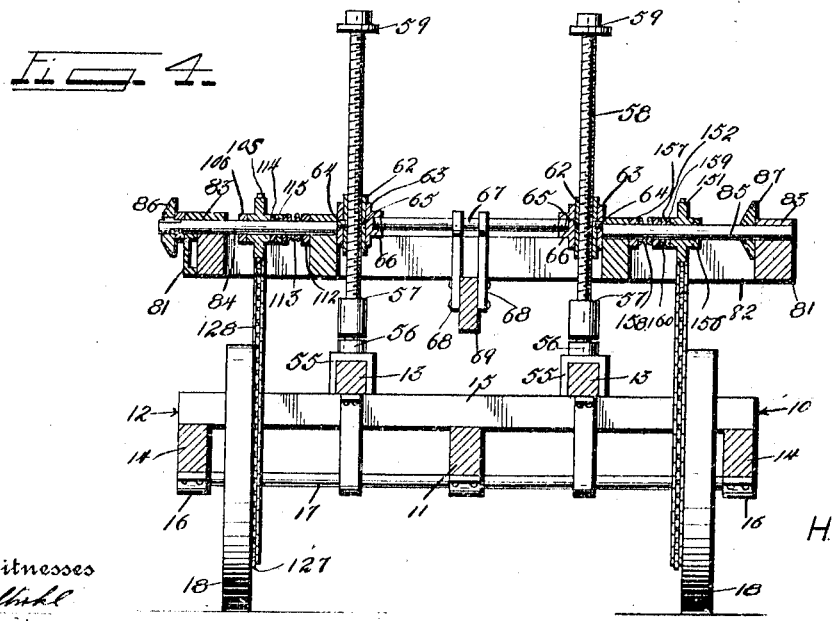
Witnesses
Inventor
H.C.Brown.
By
Attorneys.

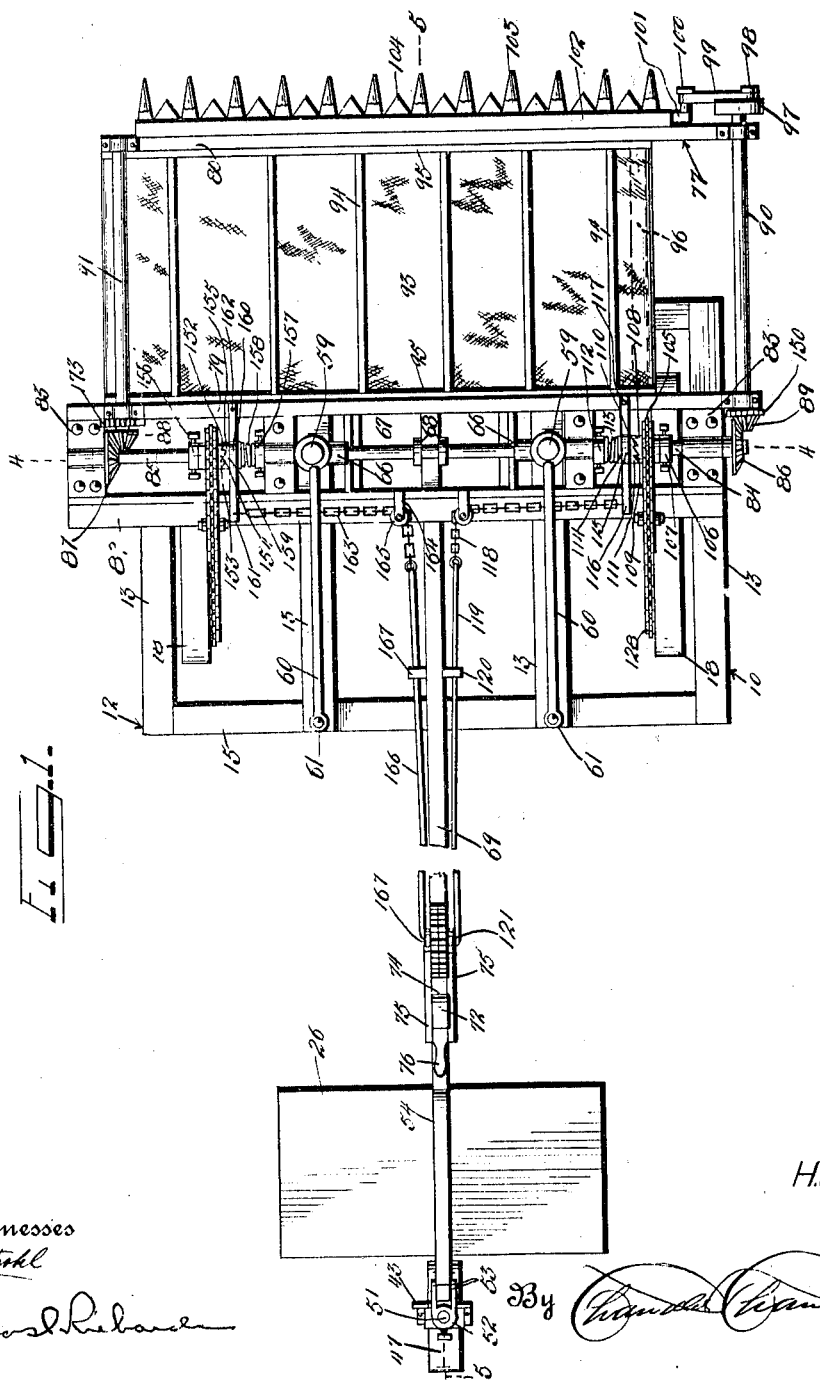

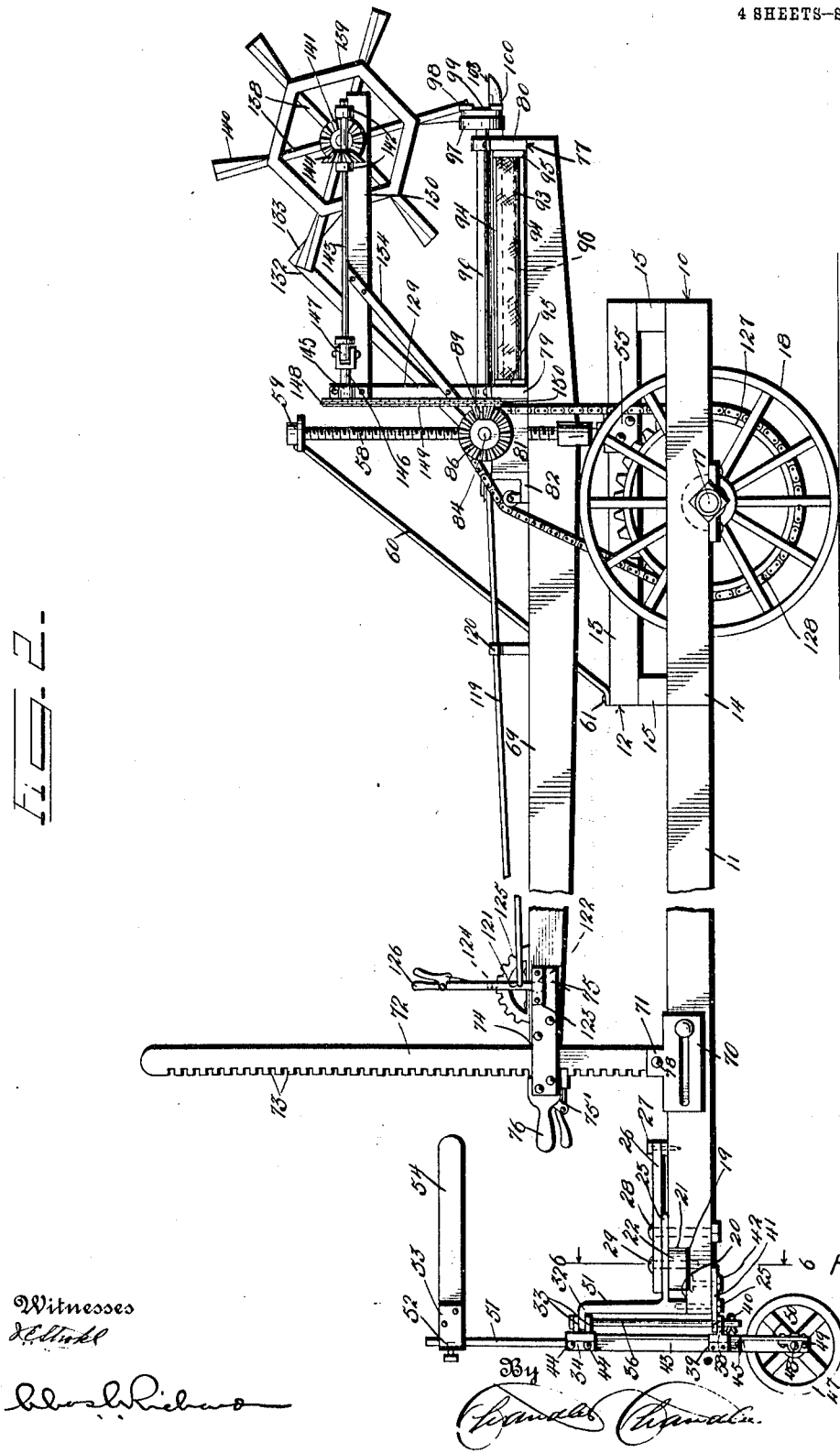

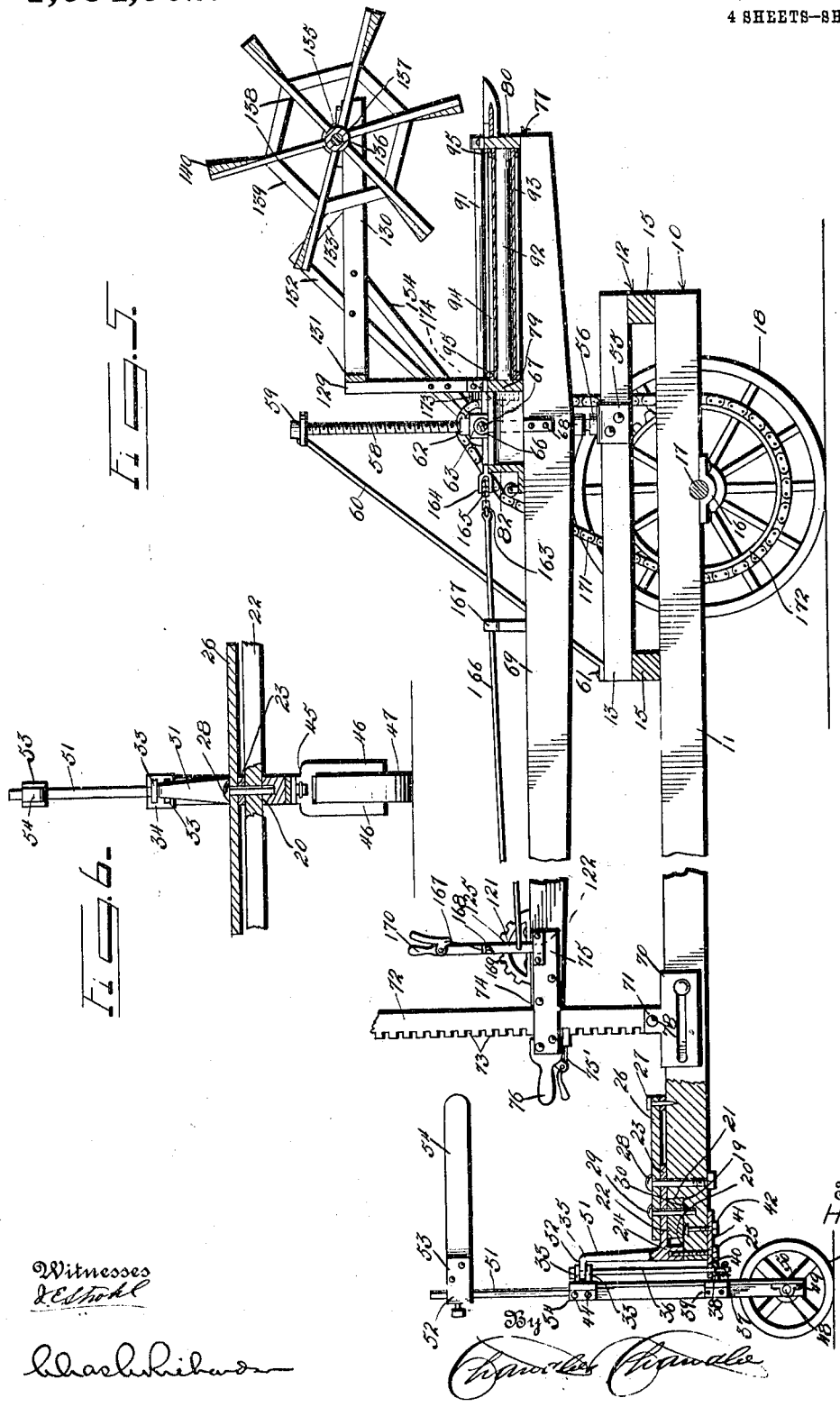

UNITED STATES PATENT OFFICE.

HENRY C. BROWN, OF FAIRVIEW, OKLAHOMA, ASSIGNOR TO BROWN KAFFIR CORN HEADER CO., OF FAIRVIEW, OKLAHOMA.

CORN-HEADER.

1,054,502.  Specification of Letters Patent.  Patented Feb. 25, 1913.

Application filed December 7, 1911. Serial No. 664,443.

*To all whom it may concern:*

Be it known that I, HENRY C. BROWN, a citizen of the United States, residing at Fairview, in the county of Major, State of Oklahoma, have invented certain new and useful Improvements in Corn-Headers; and I do hereby declare the following to be a full, clear, and exact description of the invention, such as will enable others skilled in the art to which it appertains to make and use the same.

This invention relates to new and useful improvements in corn headers, adapted more particularly for Kafir corn.

An object of this invention is the provision of an agricultural implement of the type above described which will efficiently cut a plurality of rows of corn and convey the same into a wagon or the like which is adapted to travel adjacent the machine.

Another object of this invention is the provision of a machine in which the mechanism is operated by the driving wheels thereof and which by suitable clutches may be thrown into or out of engagement with the said wheels as desired.

Still another object of this invention is the provision of a corn header which employs the use of a sickle and a conveyer, and means for transferring the corn from adjacent the sickle to the said conveyer.

A further object of this invention is the provision of an agricultural implement of the character described which is to be propelled by a plurality of horses hitched to the rear thereof, the said machine being of such nature that all of the operating parts will be located in advance of the horses and the operator's platform, from which the steering wheel can be controlled to guide the machine by an operating lever which extends above the said platform.

A still further object of this invention is to improve and simplify devices of this character, rendering them comparatively simple and inexpensive to manufacture, reliable and efficient in use and readily operated.

With the above and other objects in view, this invention resides in the novel features of construction, formations, combinations and arrangements of parts to be hereinafter more fully described, claimed and illustrated in the accompanying drawings, in which:—

Figure 1 is a top plan view of my invention with the reel mechanism omitted. Fig. 2 is a side elevation thereof. Fig. 3 is a front elevation thereof. Fig. 4 is a transverse sectional view taken on the line 4—4 of Fig. 1. Fig. 5 is a longitudinal sectional view taken on the line 5—5 of Fig. 1, and Fig. 6 is a transverse sectional view taken on the line 6—6 of Fig. 2.

Referring to the drawings, throughout the several views by similar characters of reference, the numeral 10 designates generally my improved corn header. This corn header comprises a main supporting tongue 11 which has connected to its forward extremity a supporting frame 12 comprising upper and lower longitudinally extending bars 13 and 14, which have interposed therebetween transversely extending bars 15 secured in any suitable manner to their adjacent sides. The bars 14 have secured to their under sides bearings 16 which support the front axle 17 upon the opposite ends of which are located the front or drive wheels 18. The rear end of the tongue 11 is provided with a transversely extending groove 19 producing a lower bearing face 20 which extends from the shoulder 21 to the end thereof and upon which rests the double tree 22. A plate 23 rests upon the upper side of the tongue 11 adjacent the shoulder 21 and is formed with a depending rib 24 connected with the said tongue by means of bolts or screws 25 and resting upon the bearing face 20. A platform 26 is secured to the plate 23 and tongue 11 by a bolt or other suitable fastening device 27, while the rear end thereof is similarly connected to the tongue by means of a fastener 28. A bolt 29 passes through the plate 23 and platform 26 and engages an opening or recess 30 formed in the tongue 11, extending through the bearing surface 20 and pivotally connects the double tree to the said tongue. An upwardly extending arm 31 projects from the rear extremity of the plate 23 and is bent at its upper terminal as at 32 to pass between a pair of ears 33 formed upon a sleeve 34 which ears, and bent portion are apertured as at 35 to receive a king bolt 36, the lower end of which extends through apertures 37 formed in an ear 38 carried by a sleeve 39 similar to the sleeve 34 and through an ear 40 formed upon the rearmost end of a plate 41 which is connected to the underside of the tongue 11 by the fastener 25 and a similar device 42, the head of which is countersunk to lie flush with the bearing surface 20, so as not to interfere with the necessary swinging movement of the double tree 22.

A pair of angle bars 43 are located in the sleeves 34 and 39 and are held against displacement therein by bolts 44. The lower ends of the angle bars 43 are offset as at 45 to produce a pair of spaced arms 46 between which is journaled a guide wheel 47 which is rotatable upon a supporting shaft 48 mounted in bearings 49 secured to the laterally projecting flanges 50 of the angle bars 43. A vertical shaft 51 extends from the bars 43 to which it is secured and has adjustably held upon its upper end a collar 52 which is provided with laterally extending projections 53 to which is attached an operating lever 54 which extends above the platform 26 and provides a means for steering the machine. A pair of brackets 55 are secured to the bars 13 and are preferably U-shaped to engage the opposite sides and upper faces thereof. The bights of these U-shaped members are formed with cylindrical extensions 56 which are reduced as at 57 to produce shoulders from which project spaced parallel vertically extending threaded rods 58 which have located upon their upper terminals caps 59 from which extend braces 60 secured at their lower terminals to the rear ends of the bars 13 as indicated by the numerals 61. The rods 58 have threaded thereon sleeves 62 which upon their rotation will be moved vertically thereon. Collars 63 are rotatable upon the sleeves 62 for vertical movement therewith and are held against any undesired displacement by keys 64 which project into the bores of the collars 63 and into the circumscribing grooves 65 formed intermediately of the ends of the sleeves 62. The collars 63 have extending from the inner sides thereof internally threaded socketed projections 66 which receive the oppositely threaded ends of the supporting rod 67 which is connected by means of a clevis 68 to a beam lever 69. Obviously upon the rotation of the sleeve 62 the shaft 67 will be moved vertically, and the forward end of the beam lever elevated as desired. A U-shaped bracket 70 is secured to the tongue 11 in advance of the platform 26 and is formed with a vertically extending sleeve 71 in which is secured the lower end of a vertical rack bar 72 formed upon its rear side with teeth 73 for a purpose to be later disclosed. The rear end of the lever beam 69 is formed with a vertical channel 74 in which is located the bar 72. The beam 69 and bar 72 are held in engagement by a pair of plates 75 which are secured to the opposite sides of the beam adjacent the side of the channel 74 while a spring pressed pawl 75' is pivoted to the handle 76 of the lever beam 69 for engagement with the rack teeth 73. This handle 76 is supported by the plates 75. Obviously as the handle 76 is raised or lowered the portion of the beam 69 in advance of the shaft 67 will be tilted, thereby raising or lowering the frame 77 attached thereto. In order to permit the swinging movement of the beam 69 the opening of the sleeve 71 is greater in width than the width of the bar 72 and the said bar is held therein by a pivot bolt 78 which permits of the necessary swinging movement thereof.

The frame 77 comprises a pair of spaced longitudinal bars 79 and 80 to the former of which is secured by laterally projecting bars 81, a supplemental side bar 82 to which are secured journal boxes 83, in which are located opposite side shafts 84 and 85. The shafts 84 and 85 have keyed thereon at their opposite ends beveled pinions 86 and 87 which mesh with beveled pinions 88 and 89 keyed to the rear ends of a pair of shafts 90 and 91 the latter of which is operatively connected to a roller 92 for effecting the rotation of the latter and over which roller passes an endless conveyer apron which has secured to its outer face a plurality of transverse slats and a pair of longitudinal reinforcing strips 95 disposed at each side of the apron. A roller 96 is journaled between the bars 79 and 80 in spaced relation from the roller 92 and forms a support for the opposite end of the apron 93. The shaft 90 has secured to its forward terminal a disk 97 which has extending eccentrically therefrom a wrist pin 98. This wrist pin 98 is connected by a pitman 99 to a wrist pin 100 carried by the adjacent end of a sickle bar 101 which is mounted for oscillation between a pair of spaced guides 102. The upper of the guides 102 is provided with the usual guard fingers 103 which coöperate with the cutting blades 104 upon the oscillation of the sickle bar 101 and serve to sever the stalks of corn at any desired height controlled by the lever beam 69. Obviously upon the rotation of the shaft 84 the sickle bar 101 will be operated through the medium of the shaft 90, disk 97, pitman 99 and wrist pins 98 and 100.

A sprocket wheel 105 is rotatable upon the shaft 84 and is held against any undesired longitudinal movement thereon in the direction of the pinion 86 by means of a collar 106 which is adjustably connected to the said shaft 84 by means of a set screw 107. The sprocket wheel 105 has extending from its inner face a sleeve 108 which surrounds the shaft 84 and is provided upon its inner end with a plurality of clutch teeth 109 which are adapted to engage the clutch teeth 110 formed upon a sleeve 111 keyed upon the shaft 84 for rotation therewith and also for longitudinal movement thereon. A collar 112 is secured to the shaft 84 adjacent the inner boxing 83 while a spring 113 surrounds the shaft 84 between the inner ends of the collar 112 and clutch sleeve 111 and serves to normally force the teeth 109 and 110 into engagement. The sleeve 111 is formed with a circumscribing groove 114 which engages a yoke 115 provided intermediate the ends of the operating layer 116. This lever 116 is pivoted as at 117 to the upper side of the bar 79 while the opposite end thereof is connected by a chain or other suitable flexible member 118 to an operating rod 119 which passes through a guide 120 to a lever 121 pivoted as indicated by the numeral 122 to the plate 75. A strap 123 surrounds the lever 121 and serves to prevent any undesired rocking movement thereof, while this said lever has attached thereon a spring pressed pawl 124 which engages a toothed segment 125, the engagement therewith being controlled by a hand lever 126. The sprocket wheel 105 is operatively connected with a sprocket wheel 127, secured to one of the drive wheels 18, by a chain 128 which serves upon the movement of the machine to cause the rotation of the before described shaft 84. The opposite ends of the bars 79 have projecting therefrom standards 129 which have projecting forwardly from their upper terminals a pair of supporting bars 130 which are connected by a bar 131 and braced by braces 132, 133 and 134. Bearings 135 are secured to the forward ends of the bars 130 and have journaled therein and connecting the said bars 130 a shaft 136 upon which are provided a pair of hubs 137 from which extends a plurality of radially disposed arms 138 which are connected at the opposite sides of the machine to each other by braces 139 and a plurality of plates or fan blades 140. A beveled pinion 141 is secured to the shaft 136 while the adjacent bearing 135 is extended upon opposite sides of the pinion 141 to produce bearings 142 in which is journaled a drive shaft 143 which has keyed to its forward end a pinion 144 which meshes with the pinion 141 and serves to drive the shaft 136 and cause the blades 140 to revolve therearound. A bearing 145 is mounted upon the adjacent standard 129 and has journaled therein a shaft 146 which is connected to the shaft 143 by a knuckle joint 147. The rear end of the shaft 146 has keyed thereon a sprocket wheel 148 which is connected through the medium of a chain 149 to the sprocket wheel 150 which is fixed to the rear end of the shaft 90 adjacent the beveled pinion 89. Obviously upon the rotation of the shaft 84, the sickle bar 101 will not alone be operated but also the shaft 136 and blades 140 connected thereto. The operation of these blades 140 serves to fan the cut corn upon the conveyer apron 93 whence it will be carried to the end thereof and be deposited in a wagon or the like which is driven adjacent the side of the improved corn header.

The shaft 85 is provided with a sprocket wheel 151 similar to the before mentioned sprocket wheel 105. A sleeve 152 extends from the inner side of the sprocket wheel and is provided with a plurality of clutch teeth 153 which engage similar teeth 154 located upon a sleeve 155 which is keyed to rotate with the shaft 85 and also for longitudinal sliding movement thereon. The shaft 85 has adjustable thereon the pair of collars 156 and 157 which are located adjacent the outer ends of the sprocket 151 and clutch sleeve 155 respectively, the former serving to limit the longitudinal movement of the sprocket 151 and the latter to engage one end of a spring 158 which contacts with the adjacent end of the sleeve 155 and yieldingly forces the teeth 153 and 154 normally into engagement. The sleeve 155 is provided with a circumscribing groove 159 which engages a yoke 160 supported or formed upon a lever 161 which is pivoted as indicated by the numeral 162 to one end of the bar 79. The opposite end of the lever 161 is connected to one end of a chain 163 which passes through a support 164 for engagement with a pulley 165 which serves to prevent any friction, and guides the said chain into engagement with an operating rod 166 located in a guide 167 secured to the beam 69 adjacent the similar before described guide 120. The rear end of the rod 166 is attached to an operating lever 167 pivoted to the beam 69 upon the opposite side to the lever 121. This lever 167 carries a pawl 168 which engages a segment 169 similar to the segment 125, while this said pawl is moved from engagement with the teeth of the segment 125 by an operating hand lever 170. Obviously when the lever 167 is operated the clutch teeth 153 will be disengaged, and the shaft 85 disconnected from the adjacent drive wheel 18 to which it is connected by a chain 171 which passes over the sprocket wheel 151 and a sprocket wheel 172 similar to the sprocket wheel 127 mounted on the opposite drive wheel 18. A gear wheel 173 is keyed to the shaft 91 and serves through the medium of a gear wheel 174 keyed on the roller 92 to drive the conveyer apron 93 as will be apparent from an inspection of the drawing.

As the machine is propelled to engage two rows of corn it will be apparent that the draft animals will be permitted to walk between the rows and the wagon into which the cut corn is to be deposited by the conveyer will be drawn between the next adjacent rows slightly in the rear of the cutting attachment for the machine. It should be understood in this connection that various minor changes in the details of construction and arrangement of the parts can be resorted to within the scope of the appended claims without departing from or sacrificing any of the advantages of the invention.

From the foregoing disclosures taken in connection with the accompanying drawings, it will be manifest that a machine for the purposes previously set forth is provided for which will fulfil all of the necessary requirements of such a device.

Having thus fully described this invention what I claim as new and desire to protect by Letters Patent, is:—

1. In a header of the class described, a wheeled frame, a vertical rack supported on said frame, a beam having one end provided with means for detachably engaging said rack whereby said end of the beam may be adjusted vertically, a frame supported on said beam, threaded standards supported on the first named frame in spaced relation to the rack, interiorly threaded sleeves engaged on said standards whereby the rotation of the sleeves will move same longitudinally of the standards, and connections between the sleeves and second named frame whereby the movement of the sleeves on the standards will be imparted to the said second named frame.

2. The combination in a device such as described, of a tongue, a frame carried thereby, wheels supporting said frame and tongue, means for guiding the frame, a beam adjustable upon said frame, a supporting frame upon the beam, shafts journaled at the opposite ends of the frame, sprockets located upon the shafts, sprockets carried by the wheels, chains connecting the sprockets, clutches located upon the shaft for engaging said sprockets, means for operating the clutches, a conveyer mounted in the frame, means for operatively connecting the conveyer with one of the shafts, a sickle supported by the frame, means for operatively connecting the sickle with the other of the shaft, a shaft journaled above the sickle, means for supporting the said shaft, blades supported by the shaft for transferring the cut stalks from the sickle to the conveyer and means for rotatably connecting the blade supporting shaft with one of the frame shafts.

In testimony whereof, I affix my signature, in presence of two witnesses.

HENRY C. BROWN.

Witnesses:
 W. M. BUCK,
 W. W. ENGLAND.